United States Patent
Hashimoto et al.

(10) Patent No.: US 8,345,199 B2
(45) Date of Patent: Jan. 1, 2013

(54) LIQUID CRYSTAL DISPLAY DEVICE

(75) Inventors: Yoshito Hashimoto, Osaka (JP);
Hiroyuki Ohgami, Osaka (JP);
Masakazu Shibasaki, Osaka (JP);
Masumi Kubo, Osaka (JP); Yuichi Iyama, Osaka (JP); Masayuki Soga, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 328 days.

(21) Appl. No.: 12/866,095

(22) PCT Filed: Dec. 25, 2008

(86) PCT No.: PCT/JP2008/003975
§ 371 (c)(1),
(2), (4) Date: Aug. 4, 2010

(87) PCT Pub. No.: WO2009/098747
PCT Pub. Date: Aug. 13, 2009

(65) Prior Publication Data
US 2011/0025970 A1 Feb. 3, 2011

(30) Foreign Application Priority Data
Feb. 4, 2008 (JP) .................. 2008-024200

(51) Int. Cl.
*G02F 1/1337* (2006.01)

(52) U.S. Cl. ............ 349/130; 349/56; 349/84; 349/122; 349/123; 349/139

(58) Field of Classification Search .............. 349/56, 349/84, 122, 123, 130, 139
See application file for complete search history.

(56) References Cited

U.S. PATENT DOCUMENTS 6,339,460 B1 * 1/2002 Saitoh .................... 349/117
7,113,241 B2 9/2006 Hanaoka et al.
(Continued)

FOREIGN PATENT DOCUMENTS

EP 2 224 283 A1 9/2010
(Continued)

OTHER PUBLICATIONS

English Translation of International Preliminary Report on Patentability mailed Sep. 27, 2010 and International Search Report for PCT/JP2008/003975, mailed Feb. 3, 2009.

(Continued)

*Primary Examiner* — Jennifer Doan
(74) *Attorney, Agent, or Firm* — Nixon & Vanderhye, P.C.

(57) ABSTRACT

There is provided a liquid crystal display device of high image quality, which has high brightness and excellent viewing angle characteristics.
A liquid crystal display device of the present invention includes a pair of polarizing plates, a first electrode, a second electrode provided so as to oppose the first electrode, and a liquid crystal layer interposed between the first electrode and the second electrode. Each of a plurality of pixels includes a first region and a second region which are separated by a line parallel to or perpendicular to the directions of the transmission axes of the pair of polarizing plates. The first electrode includes, in each of the first region and the second region, a plurality of first branch portions extending in a first direction and a plurality of second branch portions extending in a second direction that is different from the first direction. Each of the plurality of first branch portions in the first region has a first width. Each of the plurality of first branch portions in the second region has a second width that is different from the first width.

18 Claims, 11 Drawing Sheets

U.S. PATENT DOCUMENTS

| | | |
|---|---|---|
| 7,145,622 B2 | 12/2006 | Kataoka et al. |
| 7,605,892 B2 * | 10/2009 | Jang et al. .................... 349/117 |
| 2002/0159018 A1 | 10/2002 | Kataoka et al. |
| 2003/0043336 A1 | 3/2003 | Sasaki et al. |
| 2003/0086044 A1 | 5/2003 | Inoue et al. |
| 2003/0160750 A1 | 8/2003 | Ueda et al. |
| 2003/0193625 A1 | 10/2003 | Yoshida et al. |
| 2003/0197819 A1 | 10/2003 | Sunohara et al. |
| 2005/0253988 A1 | 11/2005 | Inoue et al. |
| 2006/0146243 A1 | 7/2006 | Nakanishi et al. |
| 2007/0103607 A1 | 5/2007 | Hanaoka et al. |
| 2009/0225257 A1 * | 9/2009 | Sugiyama et al. .............. 349/96 |

FOREIGN PATENT DOCUMENTS

| | | |
|---|---|---|
| JP | 2003-330043 | 11/2003 |
| JP | 2004-77699 | 3/2004 |
| JP | 2006-330375 | 12/2006 |

OTHER PUBLICATIONS

International Search Report for PCT/JP2008/003975, mailed Feb. 3, 2009.

U.S. Appl. No. 12/740,224, Hiroyuki Ohgami et al., filed Apr. 28, 2010.

International Search Report for PCT/JP2008/003722, mailed Jan. 27, 2009.

English translation of the International Preliminary Report on Patentability mailed Aug. 19, 2010 in corresponding PCT Application No. PCT/JP2008/003722.

* cited by examiner

LIQUID CRYSTAL DISPLAY DEVICE

This application is the U.S. national phase of International Application No. PCT/JP2008/003975 filed 25 Dec. 2008, which designated the U.S. and claims priority to JP Application No. 2008-024200 filed 4 Feb. 2008, the entire contents of each of which are hereby incorporated by reference.

TECHNICAL FIELD

The present invention relates to a liquid crystal display device and specifically to a liquid crystal display device which has a plurality of divisional alignment regions in a pixel.

BACKGROUND ART

As of now, liquid crystal display devices under development which have wide viewing angle characteristics includes liquid crystal display devices utilizing the IRS (In-Plane-Switching) mode which is a transverse electric field mode or the FFS (Fringe Field Switching) mode, and liquid crystal display devices utilizing the VA (Vertical Alignment) mode. The VA mode is better for mass production than the transverse electric field mode and is therefore used in a wide range of TV applications and mobile applications.

The VA mode liquid crystal display devices are generally classified into MVA (Muitidomain Vertical Alignment) mode liquid crystal display devices, in which one pixel includes a plurality of domains of different liquid crystal alignment directions, and CPA (Continuous Pinwheel Alignment) mode liquid crystal display devices in which the liquid crystal alignment direction continuously varies around a rivet or the like formed on an electrode at the center of a pixel.

In the MVA mode liquid crystal display devices, the alignment control means which extend in two mutually-orthogonal directions are provided to form four liquid crystal domains in one pixel, in which the azimuthal angles of the directors representing the liquid crystal domains are 45° relative to the polarization axes (transmission axes) of a pair of polarizing plates in a crossed nicols arrangement. Assuming that the direction of the polarization axis of one of the polarizing plates is azimuthal angle 0° and that the counterclockwise direction is the positive direction, the azimuthal angles of the directors of the four liquid crystal domains are 45°, 135°, 225°, and 315°. Such a structure which includes four domains in one pixel is referred to as "four-division alignment structure" or simply "4D structure". When, in each of the four domains, the alignment direction and the polarization axis of the polarizing plate form an angle of 45°, the change in retardation in a liquid crystal region can be utilized most efficiently.

The MVA mode liquid crystal display devices are not suitable to small pixels (for example, the shorter side is less than 100 μm, particularly less than 60 μm). For example, when slits (or ribs) are used as the alignment control means, the width of the slits need to be about 10 μm or more in order to obtain a sufficient alignment control force. If the slit width is narrower than this, sufficient alignment control force cannot be obtained. To form four domains, it is necessary to form, in a counter electrode, slits ("<"-shaped slit) extending in directions different by 90° from each other when seen in a direction normal to the substrate and to form, in a pixel electrode, slits which are separated by a certain space from the counter electrode slits and which extend parallel to the counter electrode slits. Specifically, both the counter electrode and the pixel electrode in one pixel need to have a plurality of slits extending in the direction of 45°-225° and the direction of 135°-315° and having the width of about 10 μm.

However, when the above-described slits are applied to a pixel whose shorter side is less than 100 μm, the ratio of the area of the slits to the pixel area increases, and accordingly, part of the pixel area which fails to contribute to display increases, so that the transmittance (brightness) significantly decreases. In the case of a small-size liquid crystal display device of finer definition, e.g., 2.4-inch VGA for use in mobile phones, the pixel pitch (row direction×vertical direction) is, for example, 25.5 μm×76.5 μm. In such a small pixel, the above-described slits cannot be formed.

In the CPA mode liquid crystal display devices, a rivet is formed of a resin or the like in the counter electrode at the pixel center, such that the rivet and a diagonal electric field produced at an edge of the pixel electrode serve to regulate the alignment of the liquid crystal. Provided in the respective gaps between the two polarizing plates and the liquid crystal layer are ¼-wave plates (quarter wave plates). By utilizing omniazimuthal, radial slope alignment domains and circular polarization, high transmittance (brightness) can be achieved.

The CPA mode which utilizes the ¼-wave plates achieves high transmittance but disadvantageously provides a low contrast ratio and a narrow viewing angle as compared with the MVA mode. Specifically, when the ¼-wave plates are used, the display (especially, the display at lower gray levels (lower brightness)) appears brighter, i.e., so-called "whitish dots" are conspicuous, when observed in a diagonal viewing angle than when observed in front of the display surface (when observed in a direction normal to the display surface (viewing angle 0°)).

To solve the above problems of the liquid crystal display device in the MVA mode and the CPA mode, liquid crystal display devices as disclosed in Patent Document 1, Patent Document 2, and Patent Document 3 have been proposed. In the liquid crystal display devices of these patent documents, the four-division alignment structure is realized by forming in the pixel electrodes a large number of narrow slits extending in the direction of 45°-225° and in the direction of 135°-315° (referred to as "fishbone pixel electrode") such that the liquid crystal is aligned parallel to the slits. In liquid crystal display devices which use such fishbone pixel electrodes, large slits or rivets are not formed in pixels, and linearly-polarized light is used without using ¼-wave plates. Therefore, display can be realized with high transmittance, high contrast ratio, and wide viewing angle.

Note that the liquid crystal display devices of these patent documents include alignment sustaining layers on surfaces of the upper and lower substrates on the liquid crystal layer side for making the liquid crystal have an appropriate pretilt angle during absence of voltage application to the liquid crystal. These alignment sustaining layers are formed by polymerizing monomers contained in the liquid crystal layer during application of a voltage to the liquid crystal.

[Patent Document 1] Japanese Laid-Open Patent Publication No. 2003-255305

[Patent Document 2] Japanese Laid-Open Patent Publication No. 2003-149647

[Patent Document 3] Japanese Laid-Open Patent Publication No. 2006-330638

DISCLOSURE OF INVENTION

Problems to be Solved by the Invention

The pixel electrodes of the liquid crystal display devices described in the aforementioned patent documents have a plurality of linear electrode portions (also referred to as "branch portions" or "line portions") extending in the direction of 45°-225° and the direction of 135°-315°. Abnormal alignment of the liquid crystal, or such a phenomenon that the liquid crystal alignment direction becomes unstable, can occur depending on the shape or size of the linear electrode portions or the shape or size of the plurality of slits extending parallel to the linear electrode portions (also referred to as "linear space portions"), resulting in the problems of variation in transmittance across the display surface, display unevenness, and abnormal gray scale.

The conventional liquid crystal display device which has linear electrode portions has another problem which will be described below.

FIG. 13 is a plan view schematically showing a structure of one pixel in a liquid crystal display device described in Patent Document 1. FIG. 14 shows the electric field distribution in a cross section of the pixel shown in FIG. 13 taken along line B-B'. FIG. 15 shows the brightness distribution in the pixel shown in FIG. 13. FIG. 16 shows the alignment of the liquid crystal in the pixel shown in FIG. 13.

As shown in FIG. 13, a pixel 210 of a liquid crystal display device 200 of Patent Document 1 is enclosed by scanning lines 22 and signal lines 23. Near an intersection of the scanning line 22 and the signal line 23, a TFT (Thin Film Transistor) 35 for switching the pixel 210 is provided. In the central area of the pixel 210, an auxiliary capacitance line 24 is provided extending parallel to the scanning lines 22.

The pixel electrode 230 provided in the pixel 210 includes a plurality of line portions of two different widths (wider line portions 230a and narrower line portions 230b) extending in the 45°-225° direction and the 135°-315° direction. In the pixel 210, the line portions in the right upper region 210a (the right half of the area lying above the auxiliary capacitance line 24) and the left lower region 210c (the left half of the area lying below the auxiliary capacitance line 24) are all extending in the 45°-225° direction. The line portions in the left upper region 210b (the left half of the area lying above the auxiliary capacitance line 24) and the right lower region 210d (the right half of the area lying below the auxiliary capacitance line 24) are all extending in the 135°-315° direction. In each of the regions, the plurality of line portions 230a are interposed between the plurality of line portions 230b. Therefore, each of these four regions 210a, 210b, 210c, and 210d includes two boundaries between the wider line portions 230a and the narrower line portions 230b.

The inventor of the present application conducted researches and found that, as shown in FIG. 14, in the vicinity of the boundaries between the region A in which the wider line portions 230a are provided and the region B in which the narrower line portions 230b are provided, an equipotential surface which is produced by application of a voltage across the liquid crystal layer becomes unstable. If there are many such boundaries, the brightness distribution during the white display has large dark portions in the vicinity of the boundaries as shown in FIG. 15 (encircled portions in the drawing). This may be because the alignment direction of the liquid crystal deviates from a desired orientation (an orientation parallel to the direction in which the line portions extend) due to the unstableness of the equipotential surface near the boundaries as illustrated in FIG. 16.

The present invention was conceived with the view of solving the above problems. One of the objects of the present invention is to provide a liquid crystal display device of high display quality, which has high transmittance and which is excellent in grayscale and viewing angle characteristics.

Means for Solving the Problems

A liquid crystal display device of the present invention is a vertical alignment type liquid crystal display device which has a plurality of pixels, including: a pair of polarizing plates which have transmission axes orthogonal to each other; a first electrode; a second electrode provided so as to oppose the first electrode; and a liquid crystal layer interposed between the first electrode and the second electrode, wherein each of the plurality of pixels includes a first region and a second region which are separated by a line parallel to or perpendicular to the directions of the transmission axes of the pair of polarizing plates, the first electrode includes, in each of the first region and the second region, a plurality of first branch portions extending in a first direction and a plurality of second branch portions extending in a second direction that is different from the first direction; each of the plurality of first branch portions in the first region has a first width, and each of the plurality of first branch portions in the second region has a second width that is different from the first width.

In one embodiment, each of the plurality of second branch portions in the first region has the first width, and each of the plurality of second branch portions in the second region has the second width.

In one embodiment, any adjacent two of the plurality of first branch portions in the first region are separated by a first space, and any adjacent two of the plurality of first branch portions in the second region are separated by a second space that is different from the first space.

In one embodiment, any adjacent two of the plurality of second branch portions in the first region are separated by the first space, and any adjacent two of the plurality of second branch portions in the second region are separated by the second space.

In one embodiment, the first region and the second region respectively correspond to one region and the other region of a pixel which are separated by a gate bus line or CS line.

In one embodiment, the first region and the second region respectively correspond to one region and the other region of a pixel which are separated by a line parallel to a source bus line.

In one embodiment, the first direction and the second direction are orthogonal to each other, and directions of the transmission axes of the pair of polarizing plates and the first direction are different by 45°, 135°, 225°, or 315°.

In one embodiment, when a voltage is applied across the liquid crystal layer, four liquid crystal domains among which an alignment direction of liquid crystal molecules is different are formed in each of the first region and the second region.

In one embodiment, each of the plurality of pixels includes a third region separated from the first region or the second region by a line parallel to or perpendicular to the directions the transmission axes of the pair of polarizing plates, the first electrode includes the plurality of first branch portions and the plurality of second branch portions in the third region, and each of the plurality of first branch portions and the plurality of second branch portions in the third region has a third width that is different from the first width or the second width.

In one embodiment, when a voltage is not applied across the liquid crystal layer, a tilt angle of liquid crystal molecules in the first region is different from a tilt angle of liquid crystal molecules in the second region.

Another liquid crystal display device of the present invention is a vertical alignment type liquid crystal display device which has a plurality of pixels, including: a pair of polarizing plates which have transmission axes orthogonal to each other; a first electrode; a second electrode provided so as to oppose the first electrode; and a liquid crystal layer interposed between the first electrode and the second electrode, wherein each of the plurality of pixels includes a first region and a second region which are separated by a line parallel to or perpendicular to the directions of the transmission axes of the pair of polarizing plates, the first electrode includes, in each of the first region and the second region, a plurality of first branch portions extending in a first direction and a plurality of second branch portions extending in a second direction that is different from the first direction; any adjacent two of the plurality of first branch portions in the first region are separated by a first space, and any adjacent two of the plurality of first branch portions in the second region are separated by a second space that is different from the first space.

In one embodiment, any adjacent two of the plurality of second branch portions in the first region are separated by the first space, and any adjacent two of the plurality of second branch portions in the second region are separated by the second space.

In one embodiment, each of the plurality of pixels includes a third region separated from the first region or the second region by a line parallel to or perpendicular to the directions of the transmission axes of the pair of polarizing plates, the first electrode includes the plurality of first branch portions and the plurality of second branch portions in the third region, and any adjacent two of the plurality of first branch portions in the third region and any adjacent two of the plurality of second branch portions in the third region are separated by a third space that is different from the first space or the second space.

In one embodiment, when a voltage is not applied across the liquid crystal layer, a tilt angle of liquid crystal molecules in the first region is different from a tilt angle of liquid crystal molecules in the second region.

Still another liquid crystal display device of the present invention is a vertical alignment type liquid crystal display device which has a plurality of pixels, including: a pair of polarizing plates which have transmission axes orthogonal to each other; a first electrode; a second electrode provided so as to oppose the first electrode; and a liquid crystal layer interposed between the first electrode and the second electrode, wherein each of the plurality of pixels includes a plurality of regions which are separated from each other by a line parallel to or perpendicular to the directions of the transmission axes of the pair of polarizing plates, the first electrode includes, in each of the plurality of regions, a plurality of first branch portions extending in a first direction and a plurality of second branch portions extending in a second direction that is different from the first direction; each of the plurality of first branch portions in one of the plurality of regions has a first width, and each of the plurality of first branch portions in another one of the plurality of regions has a second width that is different from the first width.

In one embodiment, each of the plurality of second branch portions in one of the plurality of regions has the first width, and each of the plurality of second branch portions in the another one of the plurality of regions has the second width.

Still another liquid crystal display device of the present invention is a vertical alignment type liquid crystal display device which has a plurality of pixels, including: a pair of polarizing plates which have transmission axes orthogonal to each other; a first electrode; a second electrode provided so as to oppose the first electrode; and a liquid crystal layer interposed between the first electrode and the second electrode, wherein each of the plurality of pixels includes a plurality of regions which are separated from each other by a line parallel to or perpendicular to the directions of the transmission axes of the pair of polarizing plates, the first electrode includes, in each of the plurality of regions, a plurality of first branch portions extending in a first direction and a plurality of second branch portions extending in a second direction that is different from the first direction; any adjacent two of the plurality of first branch portions in one of the plurality of regions are separated by a first space, and any adjacent two of the plurality of first branch portions in the another one of the plurality of regions are separated by a second space that is different from the first space.

In one embodiment, any adjacent two of the plurality of second branch portions in one of the plurality of regions are separated by the first space, and any adjacent two of the plurality of second branch portions in the another one of the plurality of regions are separated by the second space.

Effects of the Invention

A liquid crystal display device of the present invention has a plurality of regions among which the width or space of the branch portions of a fishbone type electrode is different, the plurality of regions being separated by a boundary line parallel to or perpendicular to the directions of the transmission axes of the polarizing plates, such that branch portions of different widths are not adjacently positioned in a liquid crystal domain. Thus, the liquid crystal display device of the present invention is capable of high quality display, in which the brightness is high and the grayscale or viewing angle characteristics are excellent.

Figure 1:
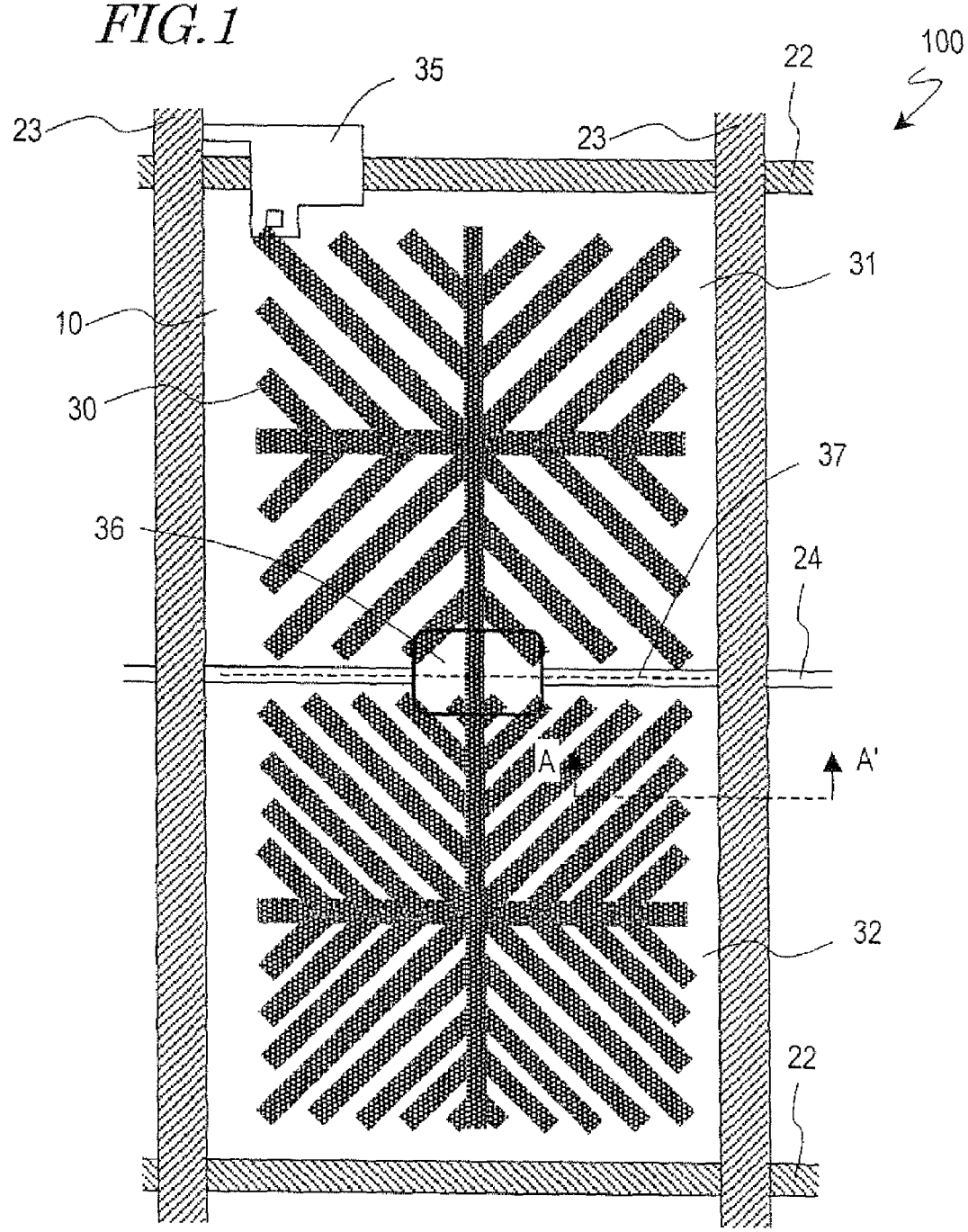
FIG. 1 A plan view schematically showing a structure of one pixel in a liquid crystal display device of embodiment 1 of the present invention.

DESCRIPTION OF THE REFERENCE NUMERALS 10 pixel
20 TFT substrate
21 glass substrate
22 scanning line
23 signal line
24 auxiliary capacitance line
25 insulation layer
26 alignment film
30 pixel electrode
30a, 30a', 30b, 30b' trunk portion
30c, 30c', 30d, 30d' branch portion
31, 31' first region
32, 32' second region
35 TFT
36 auxiliary capacitance electrode
37 boundary line
40 counter substrate
41 transparent substrate
42 CF layer
43 common electrode
44 alignment film
50 liquid crystal layer
60a, 60b polarizing plate
70 pixel electrode
70a, 70a', 70a", 70b, 70b', 70b" trunk portion
70c, 70c', 70c", 70d, 70d', 70d" branch portion
71 first region
72 second region
73 third region
77a, 77b boundary line
100, 101, 102 liquid crystal display device

BEST MODE FOR CARRYING OUT THE INVENTION

Hereinafter, the structures of liquid crystal display devices of embodiments of the present invention are described with reference to the drawings, although the present invention is not limited to the embodiments described below.

Embodiment 1

Figure 2:
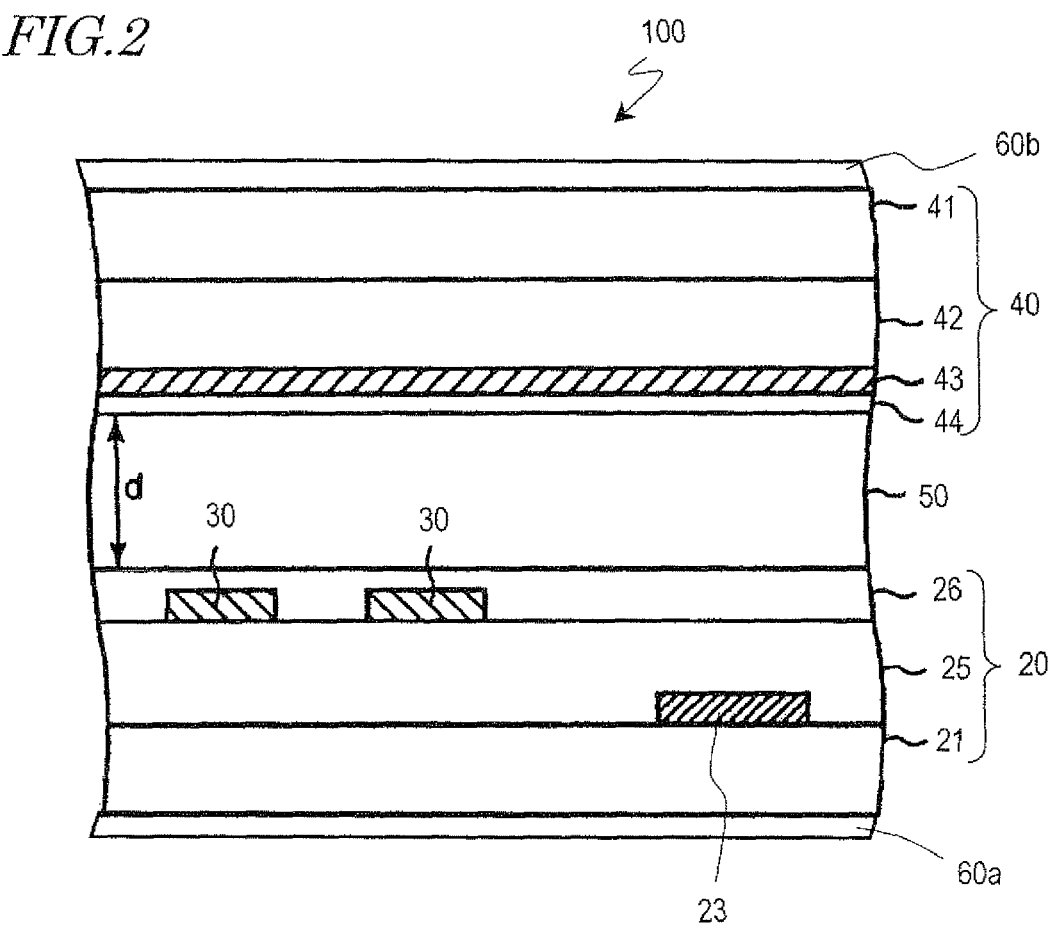
FIG. 2 A schematic cross-sectional view of the liquid crystal display device of embodiment 1 taken along line A-A' of FIG. 1.

FIG. 1 is a plan view schematically showing a structure of one pixel in a liquid crystal display device 100 of embodiment 1 of the present invention. FIG. 2 is a schematic cross-sectional view of the liquid crystal display device 100 taken along line A-A' of FIG. 1.

The liquid crystal display device 100 is a vertical alignment type liquid crystal display device which includes a plurality of pixels 10 having the structure shown in FIG. 1 and which performs display in a normally-black mode using the pixels 10 arranged in a matrix. The liquid crystal display device 100 further includes, as shown in FIG. 2, a TFT substrate 20 which is an active matrix substrate, a counter substrate 40 which is a color filter substrate, and a liquid crystal layer 50 disposed between these substrates. The liquid crystal layer 50 includes nematic liquid crystal which has negative dielectric constant anisotropy ($\Delta\varepsilon<0$).

The outer side of the TFT substrate 20 (opposite to the liquid crystal layer 50) is provided with a polarizing plate 60a. The outer side of the counter substrate 40 is provided with a polarizing plate 60b. The polarizing plates 60a and 60b are in a crossed nicols arrangement such that the light transmission axis of one of the polarizing plates extends in the horizontal direction of FIG. 1, and the light transmission axis of the other extends in the vertical direction. Note that, in the description below, the azimuthal direction from left to right in FIG. 1 is referred to as "azimuthal direction 0°", relative to which the azimuthal angles are allocated counterclockwise.

As shown in FIG. 1 and FIG. 2, the TFT substrate 20 includes a glass substrate (transparent substrate) 21, scanning lines (gate bus lines) 22, signal lines (data bus lines) 23 and auxiliary capacitance lines (Cs lines) 24 which are provided on the glass substrate 21, an insulation layer 25 which is provided over the lines, and pixel electrodes 30 and an alignment film 26 which are provided on the insulation layer 25.

Each of the pixels 10 is surrounded by two adjacent scanning lines 22 and two adjacent signal lines 23. Each pixel 10 includes a TFT 35 for switching a display voltage for the pixel electrode 30. The gate electrode and the source electrode of the TFT 35 are electrically connected to the scanning line 22 and the signal line 23, respectively, and the drain electrode is electrically connected to the pixel electrode 30. Provided under the pixel electrode 30 at the center of the pixel 10 is an auxiliary capacitance electrode 36 which is electrically connected to the auxiliary capacitance line 24.

The counter substrate 40 includes a transparent substrate 41, a CF (color filter) layer 42 provided on the transparent substrate 41 (on a surface of the transparent substrate on the liquid crystal layer 50 side), a common electrode 43 provided on the CF layer 42, and an alignment film 44 provided on the common electrode 43.

The alignment film 26 of the TFT substrate 20 and the alignment film 44 of the counter substrate 40 both include an alignment layer and an alignment sustaining layer. The alignment layer is a vertical alignment film formed over the substrate by application. The alignment sustaining layer is formed, after the formation of liquid crystal cells, by photopolymerization of photopolymerizable monomers mixed in a liquid crystal material in advance with application of a voltage across the liquid crystal layer 50. During the polymerization of the monomers, a voltage is applied across the liquid crystal layer 50 by the pixel electrode 30 and the common electrode 43. A diagonal electric field which occurs depending on the shape of the pixel electrode 30 causes liquid crystal molecules to align, and with the liquid crystal molecules being in that state, the monomers are irradiated with light to be polymerized.

Using the thus-formed alignment sustaining layer enables liquid crystal molecules to sustain (memorize) their alignment (azimuthal directions of pretilt) even after removal of the voltage (even in a state of no voltage application). In the present embodiment, the alignment films 26 and 44 are configured to provide the liquid crystal with a pretilt angle of 2° throughout the entire pixel 10. The technique of forming such an alignment film is referred to as PSA (Polymer Sustained Alignment) technique. The details of this technique are described in Patent Documents 2 and 3. These patent documents are incorporated by reference in this specification. The detailed description of the alignment sustaining layer is herein omitted.

Note that, as shown in FIG. 1, the pixel 10 is constituted of a first region 31 which is on the upper side of a virtual boundary line 37 passing through the center of the auxiliary capacitance line 24, and a second region 32 which is on the lower side of the boundary line 37. In other words, the pixel 10 is constituted of the first region 31 and the second region 32, which are separated from each other by a line parallel to or perpendicular to the directions of the transmission axes of the pair of polarizing plates 60a and 60b (boundary line 37). The first region 31 and the second region 32 can alternatively be defined as regions separated from each other by the auxiliary capacitance line 24. A pixel arrangement in which these regions are separated by the scanning line 22 or the signal line 23 may be employed.

Next, the shape of a pixel electrode 30 is described with reference to FIG. 3.

Figure 3:
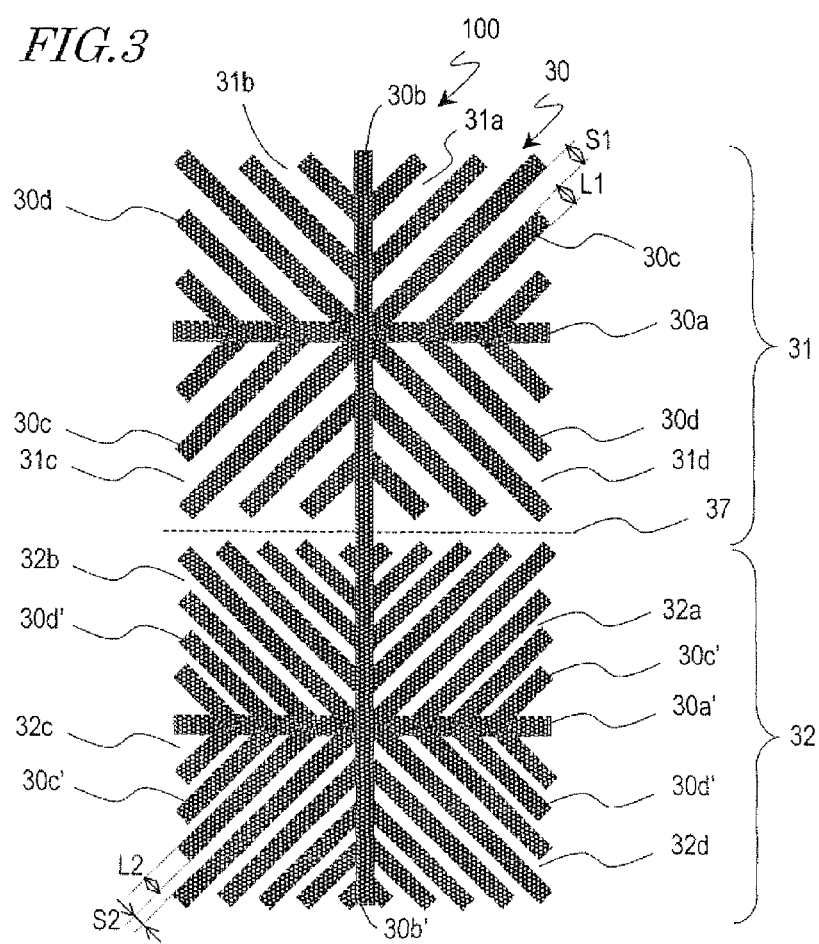
FIG. 3 A plan view schematically showing a shape of a pixel electrode of the liquid crystal display device of embodiment 1.

FIG. 3 is a plan view showing the shape of the pixel electrode 30. As shown in FIG. 3, the pixel electrode includes trunk portions 30a and 30a' extending in the direction of azimuthal angle 0°-180°, trunk portions 30b and 30b' extending in the direction of azimuthal angle 90°-270°, a plurality of branch portions 30c and 30c' (first branch portions) extending in the direction of azimuthal angle 45°-225° (first direction), and a plurality of branch portions 30d and 30d' (second branch portions) extending in the direction of azimuthal angle 135°-315° (second direction).

In the first region 31, the pixel electrode 30 includes the trunk portions 30a and 30b that intersect each other at right angles in the central area of the first region 31, and the plurality of branch portions 30c and the plurality of branch portions 30d that branch off from the trunk portion 30a or 30b. Among divisional parts of the first region 31 separated by the trunk portion 30a and the trunk portion 30b, the right upper part (or "domain"), the left upper part, the left lower part, and the right lower part in the drawing are referred to as the first domain 31a, the second domain 31b, the third domain 31c, and the fourth domain 31d, respectively. In the first domain 31a, the branch portions 30c extend from the trunk portion 30a or 30b in the 45° direction. In the second domain 31b, the branch portions 30d extend from the trunk portion 30a or 30b in the 135° direction. In the third domain 31c, the branch portions 30c extend from the trunk portion 30a or 30b in the 225° direction. In the fourth domain 31d, the branch portions 30d extend from the trunk portion 30a or 30b in the 315° direction.

Widths L1 (first widths) of the branch portions 30c and the branch portions 30d are all equal. The distance between any adjacent two of the branch portions 30c in each of the first domain 31a and the third domain 31c and the distance between any adjacent two of the branch portions 30d in each of the second domain 31b and the fourth domain 31d, distances S1, are all equal.

In the second region 32, the pixel electrode 30 includes the trunk portions 30a' and 30b' that intersect each other at right angles in the central area of the second region 32, and the plurality of branch portions 30c' and the plurality of branch portions 30d' that branch off from the trunk portion 30a' or 30b'. Among divisional parts of the second region 32 separated by the trunk portion 30a' and the trunk portion 30b', the right upper part, the left upper part, the left lower part, and the right lower part in the drawing are referred to as the first domain 32a, the second domain 32b, the third domain 32c, and the fourth domain 32d, respectively. In the first domain 32a, the branch portions 30c' extend from the trunk portion 30a' or 30b' in the 45° direction. In the second domain 32b, the branch portions 30d' extend from the trunk portion 30a' or 30b' in the 135' direction. In the third domain 32c, the branch portions 30c' extend from the trunk portion 30a' or 30b' in the 225° direction. In the fourth domain 32d, the branch portions 30d' extend from the trunk portion 30a' or 30b' in the 315° direction.

All of the branch portions 30c' and the branch portions 30d' have equal widths (second width L2) which are different from width L1. The distance between any adjacent two of the branch portions 30c' in each of the first domain 32a and the third domain 32c and the distance between any adjacent two of the branch portions 30d' in each of the second domain 32b and the fourth domain 32d, distances S2, are all equal. Distance S2 is different from distance S1.

Note that width L1 and width L2 of the branch portions each refer to a dimension of a branch portion perpendicular to the direction in which the branch portions extend. Distances S1 and S2 between two branch portions each refer to a dimension of a gap (slit portion) formed between adjacent two branch portions that is perpendicular to the direction in which the branch portions extend. Width L2 and width L2 are sometimes referred to as "line width L1" and "line width L2", respectively. Distance S1 and distance S2 are sometimes referred to as "slit width S1" and "slit width S2", respectively. The values of width L1 and distance S1 are, for example, 1.5 μm and 3.0 μm, respectively. The values of width L2 and distance S2 are, for example, 2.5 μm and 2.5 μm, respectively. Widths L1 and L2 and distances S1 and S2 are not limited to these values, but may desirably be set to 5.0 μm or less.

The pixel electrode 30 which has the above-described shape and the alignment films 26 and 44 form a multidomain of 4D structure in each of the first region 31 and the second region 32. When no voltage is applied, the azimuthal directions of the pretilt of the liquid crystal molecules in the respective domains are parallel to the branch portions 30c, 30d, 30c', or 30d' in the respective domains, depending on the azimuthal directions memorized in the alignment films 26 and 44. When a voltage is applied, the liquid crystal molecules of the respective domains are oriented in polar angle directions whose azimuthal directions are parallel to the branch portions 30c, 30d, 30c', or 30d' in the domains (the azimuthal directions of the directors of the domains) and which are more parallel to the substrate surface. In this case, the azimuthal directions of the orientation are coincident with the azimuthal directions of the pretilt, and therefore, the orientation in correct azimuthal directions with an extremely high response rate is realized.

Since the liquid crystal display device 100 of embodiment 1 has the pixel electrode 30 which has the above-described shape, the boundary between the domain formed by the branch portions 30c and 30d in the first region 31 and the domain formed by the branch portions 30c' and 30d' in the second region lies on the boundary line 37 (or on the auxiliary capacitance line 24). Thus, the respective domains do not include any region in which a wider branch portion and a narrower branch portion be adjacently positioned.

Figure 4:
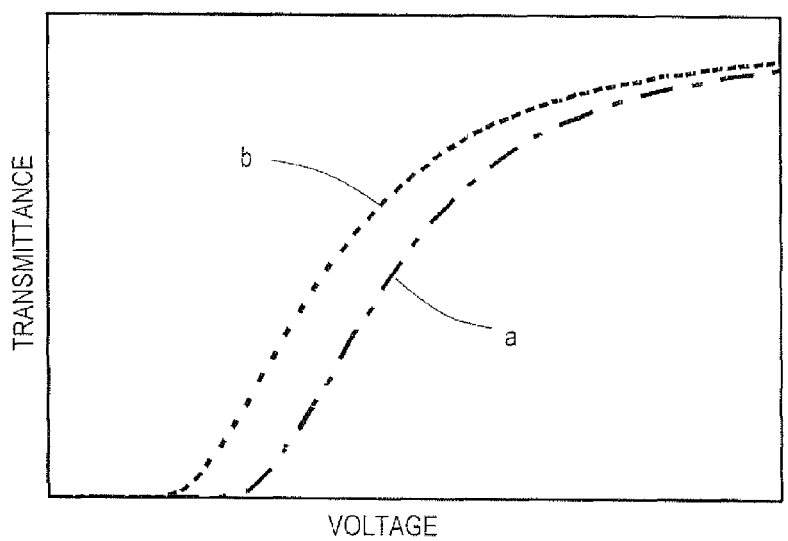
FIG. 4 A graph illustrating the VT characteristic of a pixel of the liquid crystal display device of embodiment 1.

FIG. 4 is a graph illustrating the voltage dependence of the transmittance (VT characteristic) in the first region 31 and the second region 32 when the display surface is viewed from a position in front of the display surface (in the polar angle 0° direction). In the graph, lines a and b represent the VT characteristics in the first region 31 and the second region 32, respectively.

Between the first region 31 and the second region 32, the width of the branch portions and the space between two branch portions are different. Accordingly, the liquid crystal alignment control force is also different between these two regions. Therefore, the different VT characteristics such as shown in FIG. 4 are obtained in the two regions. Note that the VT characteristic across the entire display surface is equal to the average of these two VT characteristics.

In general, the VT characteristic achieved by a pixel electrode having a specific shape is different from an ideal characteristic, and therefore, defects such as whitish or blackish dots can occur in display. In the liquid crystal display device of embodiment 1, two different VT characteristics can be obtained in one pixel, and the VT characteristic achieved across the entire display surface is equal to the average of the two VT characteristics. Therefore, ideal brightness and grayscale characteristics can be obtained by appropriately setting widths L1 and L2 and distances S1 and S2 depending on the size, shape, or use of the liquid crystal display device.

Figure 5:
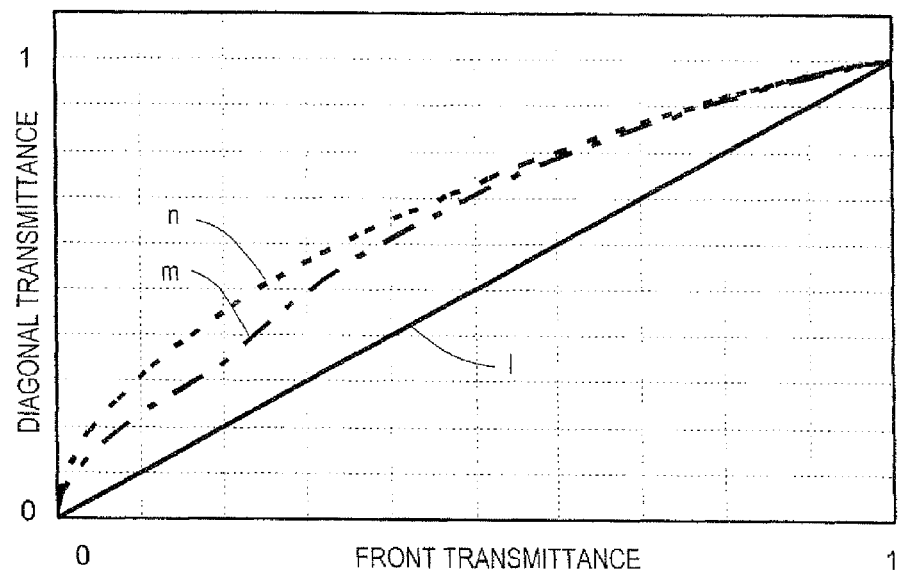
FIG. 5 A graph for illustrating the viewing angle characteristics of a pixel of the liquid crystal display device of embodiment 1.

FIG. 5 is a graph for illustrating the viewing angle characteristics of the liquid crystal display device 100 of the present embodiment. In FIG. 5, line m represents the relationship between the transmittance obtained when the display surface of the liquid crystal display device 100 which has the pixel 10 is viewed from a position in front of the display surface (front transmittance) and the transmittance obtained when the display surface is viewed in a direction defined by azimuthal angle 45° and polar angle 60° (diagonal transmittance). This relationship is hereinafter simply referred to as "viewing angle characteristic". Specifically, line m represents the average of the viewing angle characteristics obtained in the first region 31 and the second region 32. Line n represents the viewing angle characteristic obtained in the first region 31 (in which the pixel electrode does not have two different line widths or slit widths). Note that line 1 in FIG. 5 is a reference line on which the front transmittance and the diagonal transmittance are equal.

As seen from FIG. 5, by arranging pixel electrode portions having two line widths or slits widths into two separate regions as in the present embodiment, the difference between the front transmittance and the diagonal transmittance becomes small, i.e., the viewing angle characteristics improve, as compared with a case where a pixel electrode used has a single line width and a single slit width.

Figure 6:
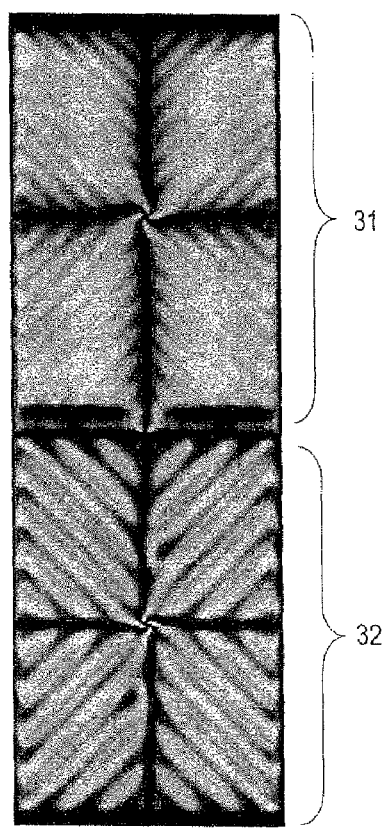
FIG. 6. An image showing a state of white display in pixels of the liquid crystal display device of embodiment 1.
Figure 15:
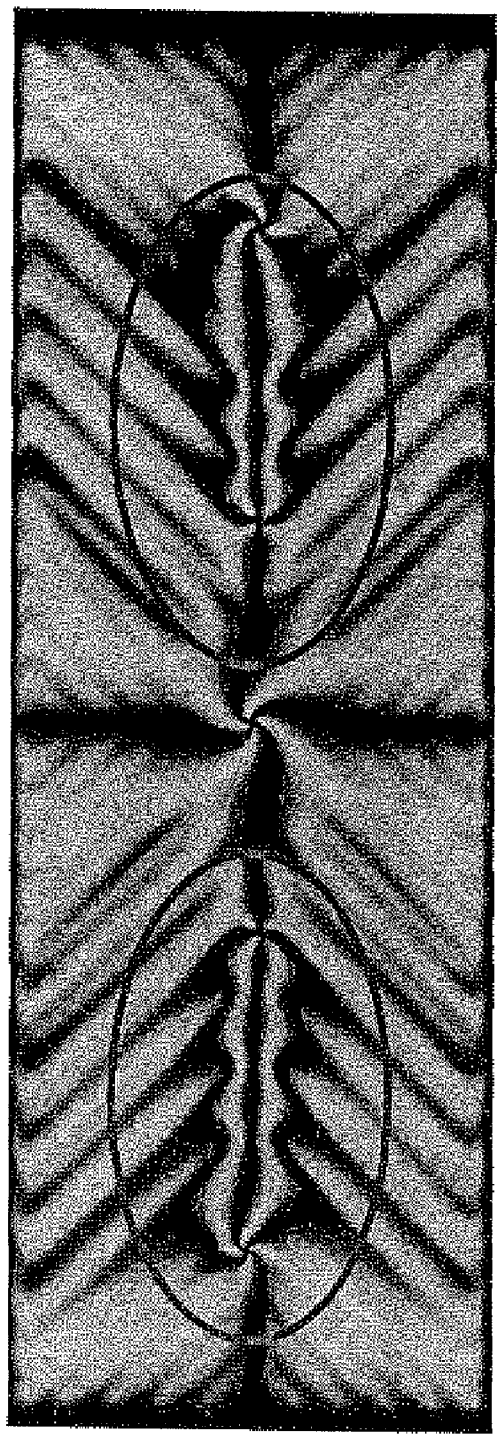
FIG. 15 An image showing the brightness distribution in the pixel shown in FIG. 13.
Figure 16:
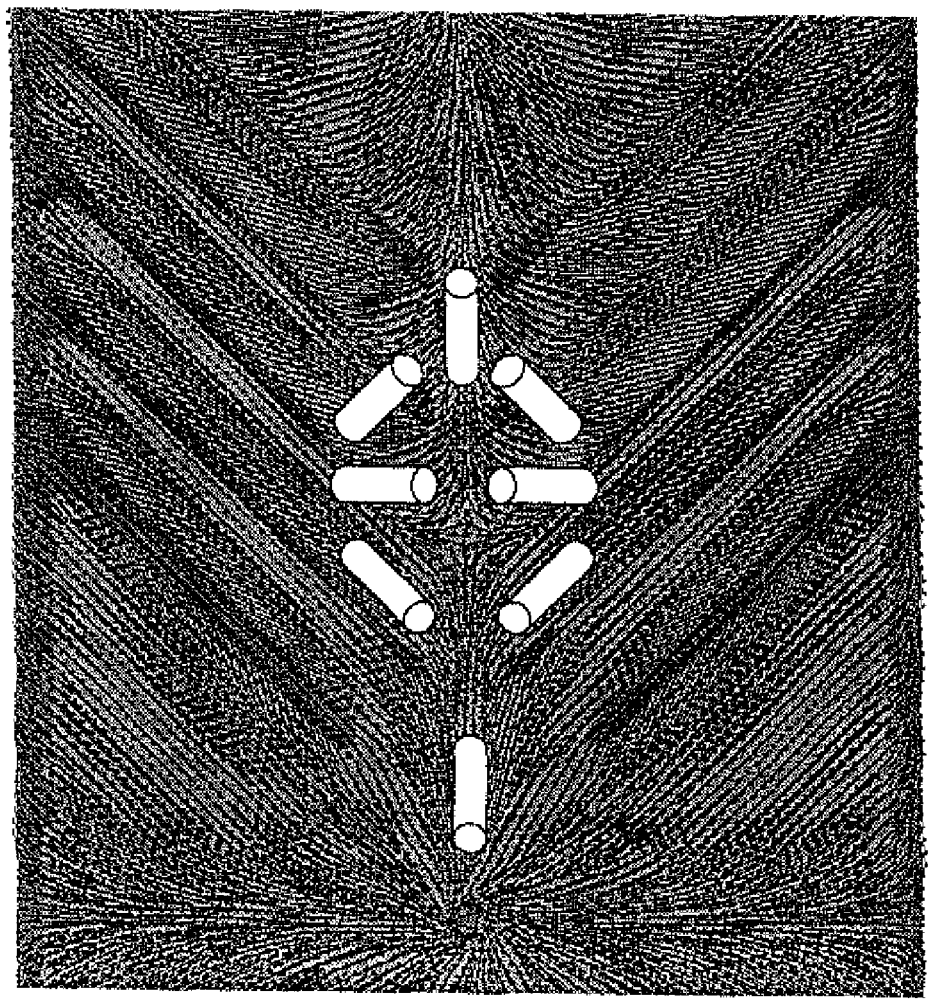
FIG. 16 A diagram showing the alignment of the liquid crystal in the pixel shown in FIG. 13.

FIG. 6 is an image showing a state of white display in the first region 31 and the second region 32. As shown in FIG. 15, in the conventional liquid crystal display device, each of the four domains includes two regions (one pixel includes eight regions) in which a wider branch portion and a narrower branch portion are adjacently positioned, so that abnormal alignment the liquid crystal occurs. As a result, during the white display, a relatively large dark portion occurs in the central area of the pixel, deteriorating the transmittance and brightness. On the other hand, in embodiment 1, the pixel electrode 30 has the above-described shape, and therefore, the eight domains of the pixel 10 do not include any region in which a wider branch portion and a narrower branch portion be adjacently positioned. Thus, according to embodiment 1, the abnormal alignment of the liquid crystal is unlikely to occur, and display with high brightness can be achieved in which occurrence of a dark portion is prevented as shown in FIG. 6.

Thus, the liquid crystal display device of embodiment 1 is capable of high quality display with excellent grayscale characteristics and viewing angle characteristics and with high brightness. Note that the shape of the pixel electrode 30 of embodiment 1 may be applied to the shape of the counter electrode in one pixel. In this case also, substantially the same effects as those described above can be obtained.

Embodiment 2

Hereinafter, a liquid crystal display device of embodiment 2 of the present invention is described. The liquid crystal display device of embodiment 2 has a pixel electrode of another fishbone shape in place of the pixel electrode 30 of the liquid crystal display device of embodiment 1, and the other elements are the same as those of embodiment 1. Thus, only the pixel electrode is described below.

Figure 7:
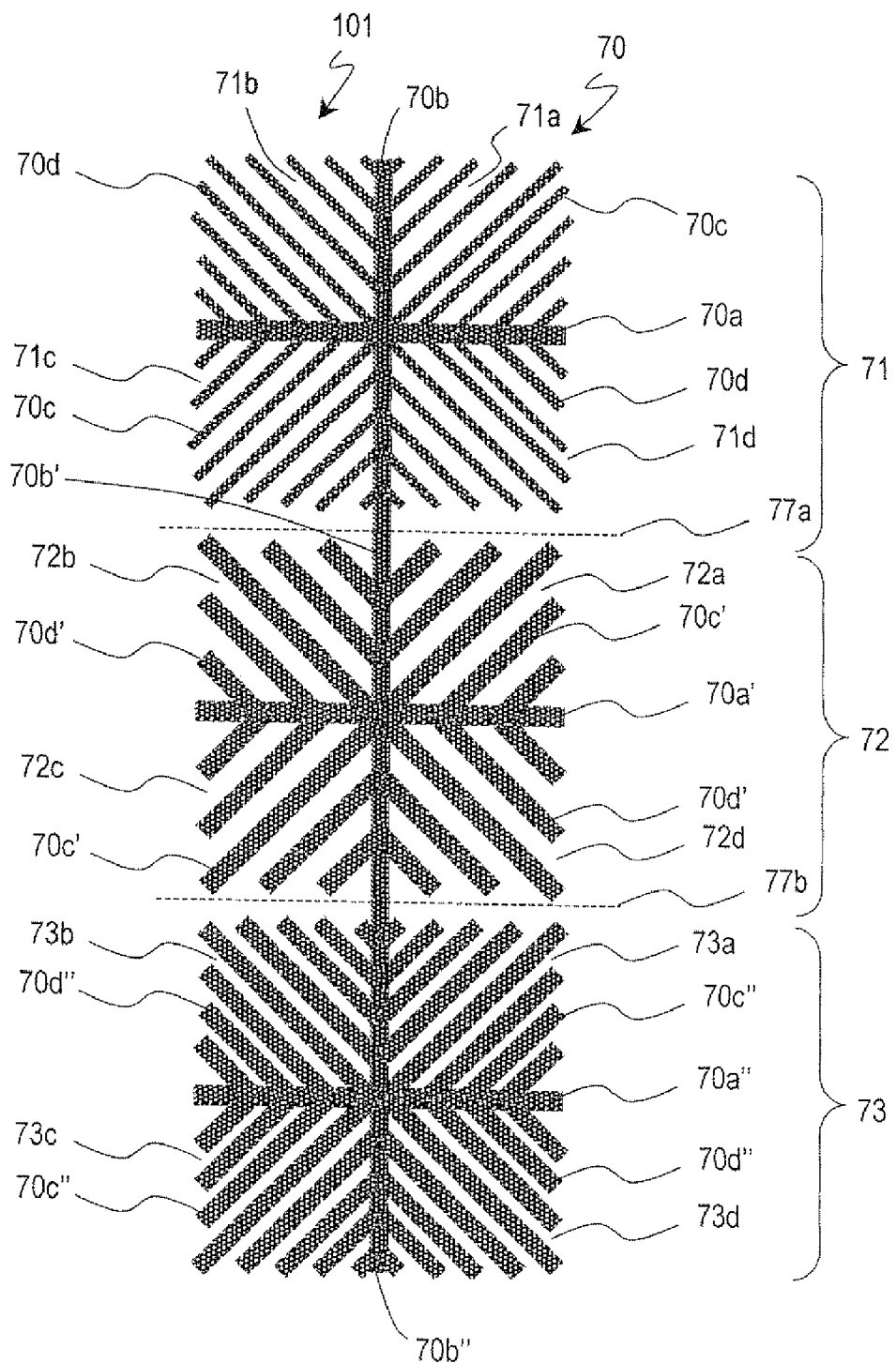
FIG. 7 A plan view schematically showing a structure of one pixel in a liquid crystal display device of embodiment 2 of the present invention.

FIG. 7 is a plan view schematically showing one of a plurality of pixel electrodes 70 arranged in a liquid crystal display device 101 of embodiment 2.

As shown in FIG. 7, the pixel electrode 70 includes trunk portions 70a, 70a', and 70a" extending in the direction of azimuthal angle 0°-180°, trunk portions 70b, 70b', and 70b" extending in the direction of azimuthal angle 90°-270°, a plurality of branch portions 70c, 70c', and 70c" (first branch portions) extending in the direction of azimuthal angle 45°-225° (first direction), and a plurality of branch portions 70d, 70d', and 70d" (second branch portions) extending in the direction of azimuthal angle 135°-315° (second direction).

The pixel of embodiment 2 includes a first region 71, a second region 72, and a third region 73 which are separated by two virtual boundary lines 77a and 77b extending parallel to the scanning line (parallel to or vertical to the directions of the transmission axes of the pair of polarizing plates). The boundary line 77a separates the first region 71 and the second region 72 from each other. The boundary line 77b separates the second region 72 and the third region 73 from each other.

In the first region 71, the pixel electrode 70 includes the trunk portions 70a and 70b that intersect each other at right angles in the central area of the first region 71, and the plurality of branch portions 70c and the plurality of branch portions 70d that branch off from the trunk portion 70a or 70b. Among divisional parts of the first region 71 separated by the trunk portion 70a and the trunk portion 70b, the right upper part (or "domain"), the left upper part, the left lower part, and the right lower part in the drawing are referred to as the first domain 71a, the second domain 71b, the third domain 71c, and the fourth domain 71d, respectively. In the first domain 71a, the branch portions 70c extend from the trunk portion 70a or 70b in the 45° direction. In the second domain 71b, the branch portions 70d extend from the trunk portion 70a or 70b in the 135° direction. In the third domain 71c, the branch portions 70c extend from the trunk portion 70a or 70b in the 225° direction. In the fourth domain 71d, the branch portions 70d extend from the trunk portion 70a or 70b in the 315° direction.

The widths of the branch portions 70c and 70d (first line widths) are all equal. The distance between any adjacent two of the branch portions 70c in each of the first domain 71a and the third domain 71c and the distance between any adjacent two of the branch portions 70d in each of the second domain 71b and the fourth domain 71d (first slit widths) are all equal.

In the second region 72, the pixel electrode includes the trunk portions 70a' and 70b' that intersect each other at right angles in the central area of the second region 72, and the plurality of branch portions 70c' and the plurality of branch portions 70d' that branch off from the trunk portion 70a' or 70b'. Among divisional parts of the second region 72 separated by the trunk portion 70a' and the trunk portion 70b', the right upper part, the left upper part, the left lower part, and the right lower part in the drawing are referred to as the first domain 72a, the second domain 72b, the third domain 72c, and the fourth domain 72d, respectively. In the first domain 72a, the branch portions 70c' extend from the trunk portion 70a' or 70b' in the 45° direction. In the second domain 72b, the branch portions 70d' extend from the trunk portion 70a' or 70b' in the 135° direction. In the third domain 72c, the branch portions 70c' extend from the trunk portion 70a' or 70b' in the 225° direction. In the fourth domain 72d, the branch portions 70d' extend from the trunk portion 70a' or 70b' in the 315° direction.

All of the branch portions 70c' and the branch portions 70d' have equal widths (second line width) which are different from the first line width. The distance between any adjacent two of the branch portions 70c' in each of the first domain 72a and the third domain 72c and the distance between any adjacent two of the branch portions 70d' in each of the second domain 72b and the fourth domain 72d (second slit widths) are all equal. The second slit width is different from the first slit width.

In the third region 73, the pixel electrode includes the trunk portions 70a" and 70b" that intersect each other at right angles in the central area of the third region 73, and the plurality of branch portions 70c" and the plurality of branch portions 70d" that branch off from the trunk portion 70a" or 70b". Among divisional parts of the third region 73 separated by the trunk portion 70a" and the trunk portion 70b", the right upper part, the left upper part, the left lower part, and the right lower part in the drawing are referred to as the first domain 73a, the second domain 73b, the third domain 73c, and the fourth domain 73d, respectively. In the first domain 73a, the branch portions 70c" extend from the trunk portion 70a" or 70b" in the 45° direction. In the second domain 73b, the branch portions 70d" extend from the trunk portion 70a" or 70b" in the 135° direction. In the third domain 73c, the branch portions 70c" extend from the trunk portion 70a" or 70b" in the 225° direction. In the fourth domain 73d, the branch portions 70d" extend from the trunk portion 70a" or 70b" in the 315° direction.

All of the branch portions 70c" and the branch portions 70d" have equal widths (third line width) which are different from the first line width or the second line width. The distance between any adjacent two of the branch portions 70c" in each of the first domain 73a and the third domain 73c and the distance between any adjacent two of the branch portions 70d" in each of the second domain 73b and the fourth domain 73d (third slit widths) are all equal. The third slit width is different from the first slit width or the second slit width.

The first line width, the second line width, and the third line width are, for example, 1.5 μm, 2.5 μm, and 2.0 μm, respectively. The first slit width, the second slit width, and the third slit width are, for example, 4.0 μm, 3.5 μm, and 2.5 μm, respectively. The line widths and the slit widths are not limited to these values, but may desirably be set to 5.0 μm or less.

The pixel electrode 70 which has the above-described shape and the alignment films form a multidomain of 4D structure in each of the first region 71, the second region 72, and the third region 73. When no voltage is applied, the azimuthal directions of the pretilt of the liquid crystal molecules in the respective domains are parallel to the branch portions in the respective domains, depending on the azimuthal directions memorized in the alignment films. When a voltage is applied, the liquid crystal molecules of the respective domains are oriented in a polar angle directions whose azimuthal directions are parallel to the branch portions in the domains (the azimuthal directions of the directors of the domains) and which are more parallel to the substrate surface. In this case, the azimuthal directions of the orientation are coincident with the azimuthal directions of the pretilt, and therefore, the orientation in correct azimuthal directions with an extremely high response rate is realized.

Since the liquid crystal display device 101 of embodiment 2 has the pixel electrode 70 which has the above-described shape, the boundary between the domain formed by the branch portions 70c and 70d in the first region 71 and the domain formed by the branch portions 70c' and 70d' in the second region 72 lies on the boundary line 77a, and the boundary between the domain formed by the branch portions 70c' and 70d' in the second region 72 and the domain formed by the branch portions 70c" and 70d" in the third region 73 lies on the boundary line 77b. Thus, the respective domains do not include any region in which branch portions of different widths be adjacently positioned.

Figure 8:
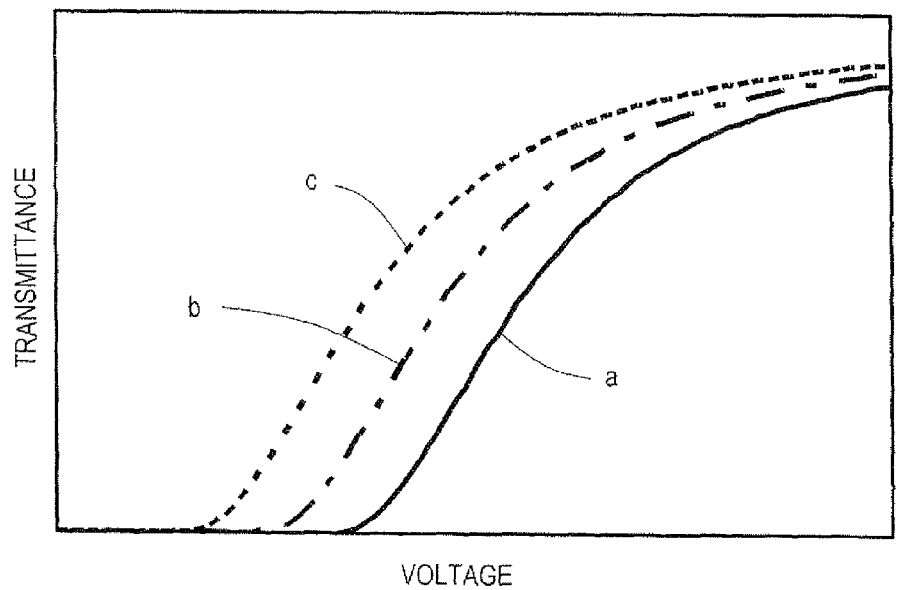
FIG. 8 A graph illustrating the VT characteristic of a pixel of the liquid crystal display device of embodiment 2.

FIG. 8 is a graph illustrating the voltage dependence of the transmittance (VT characteristic) in the first region 71, the second region 72, and the third region when the display surface is viewed from a position in front of the display surface (in the polar angle 0° direction). In FIG. 8, lines a, b, and c represent the VT characteristics in the first region 71, the second region 72, and the third region 73, respectively.

Among the first region 71, the second region 72, and the third region 73, the width of the branch portions and the space between two branch portions are different. Accordingly, the liquid crystal alignment control force is also different among these three regions. Therefore, the different VT characteristics such as shown in FIG. 8 are obtained in the three regions. Note that the VT characteristic across the entire display surface is equal to the average of these three VT characteristics.

In the liquid crystal display device of embodiment 2, three different VT characteristics can be obtained in one pixel, and the VT characteristic achieved across the entire display surface is equal to the average of the three VT characteristics. Therefore, ideal brightness and grayscale characteristics can be obtained by appropriately setting the line widths and the slit widths in the respective regions depending on the size, shape, or use of the liquid crystal display device.

Figure 9:
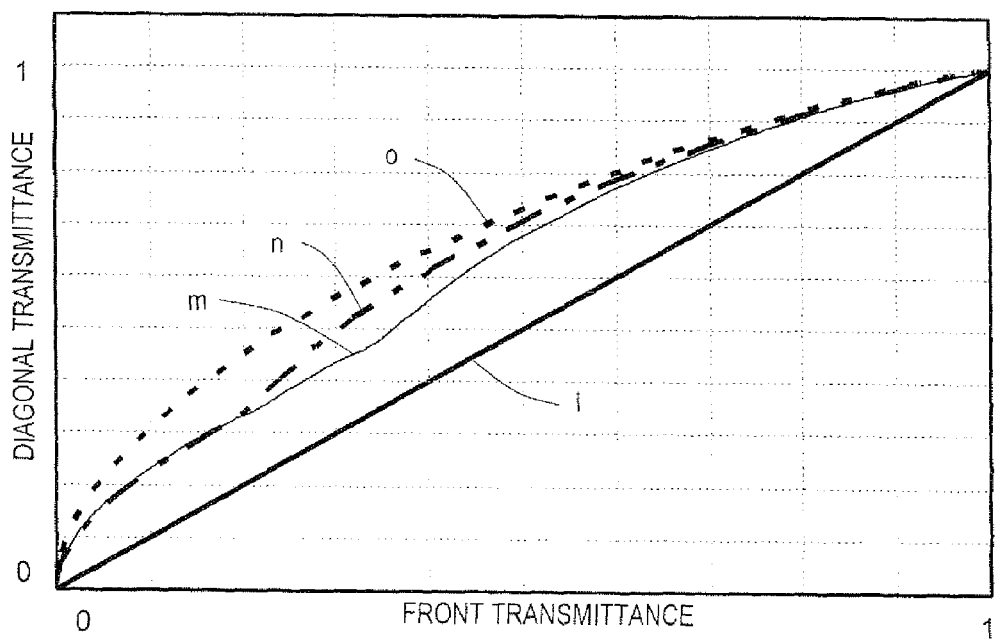
FIG. 9 A graph for illustrating the viewing angle characteristics of a pixel of the liquid crystal display device of embodiment 2.

FIG. 9 is a graph for illustrating the viewing angle characteristics of the liquid crystal display device 101 of embodiment 2. In FIG. 9, line m represents the viewing angle characteristic of the liquid crystal display device 101 of the present embodiment which includes the pixel electrode 70. Specifically, line m represents the average of the viewing angle characteristics obtained in the first region 71, the second region 72, and the third region 73. Line n represents the average of the viewing angle characteristics obtained in two of the first region 71, the second region 72, and the third region 73 (for example, the average of the viewing angle characteristics of the first region 71 and the third region 73). Line o represents the viewing angle characteristic obtained in any one of the first region 71, the second region 72, and the third region 73 (for example, the viewing angle characteristic of the first region 71). Note that line 1 in FIG. 9 is a reference line on which the front transmittance and the diagonal transmittance are equal.

As seen from FIG. 9, the liquid crystal display device of the present embodiment achieves more excellent viewing angle characteristics than a liquid crystal display device in which the pixel electrode has a single line width and a single slit width. The liquid crystal display device of the present embodiment also achieves more excellent viewing angle characteristics than a liquid crystal display device in which the pixel electrode has two line widths and two slit widths.

The domains formed in the first region 71, the second region 72, and the third region 73 do not include any region in which a wider branch portion and a narrower branch portion be adjacently positioned. Thus, according to embodiment 2, the abnormal alignment of the liquid crystal is unlikely to occur, and display with high brightness can be achieved in which occurrence of a dark portion is prevented as in embodiment 1.

Thus, the liquid crystal display device of embodiment 2 is capable of high quality display with excellent grayscale characteristics and viewing angle characteristics and with high brightness. Note that the shape of the pixel electrode 70 of embodiment 2 may be applied to the shape of the counter electrode in one pixel. In this case also, substantially the same effects as those described above can be obtained.

Embodiment 3

Hereinafter, a liquid crystal display device of embodiment 3 of the present invention is described. The liquid crystal display device of embodiment 3 has a different pretilt angle of the liquid crystal from that defined by the alignment films 26 and 44 of the liquid crystal display device of embodiment 1, and the other elements are the same as those of embodiment 1. Hereinafter, the differences from embodiment 1 are mainly described.

Figure 10:
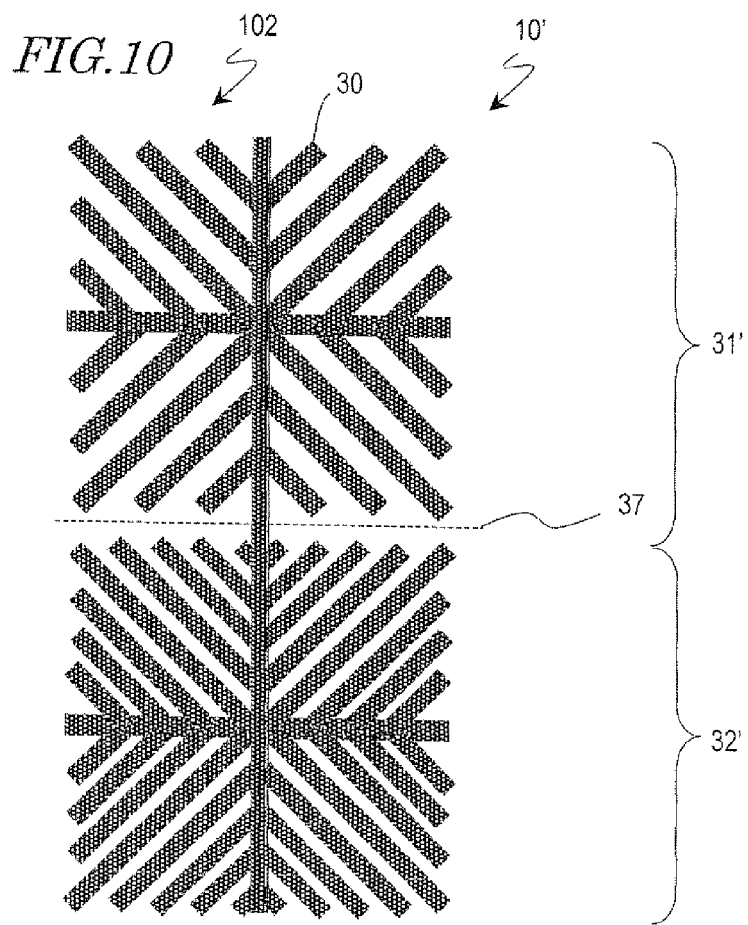
FIG. 10 A plan view schematically showing a structure of one pixel in a liquid crystal display device of embodiment 3 of the present invention.

FIG. 10 is a plan view schematically showing the structure of a pixel 10' in a liquid crystal display device 102 of embodiment 3. The pixel 10' is constituted of a first region 31' and a second region 32' which are separated from each other by a boundary line 37. The pixel 10' includes a pixel electrode 30 that has the shape previously described in embodiment 1. In the present embodiment, the tilt angle of the liquid crystal molecules in the first region 31' in the absence of an applied voltage across the liquid crystal layer is different from the tilt angle of the liquid crystal molecules in the second region 32'. The alignment films 26 and 44 in the first region 31' are configured to provide the liquid crystal with a pretilt angle of 2°. The alignment films 26 and 44 in the second region 32' are configured to provide the liquid crystal with a pretilt angle of 5°.

Figure 11:
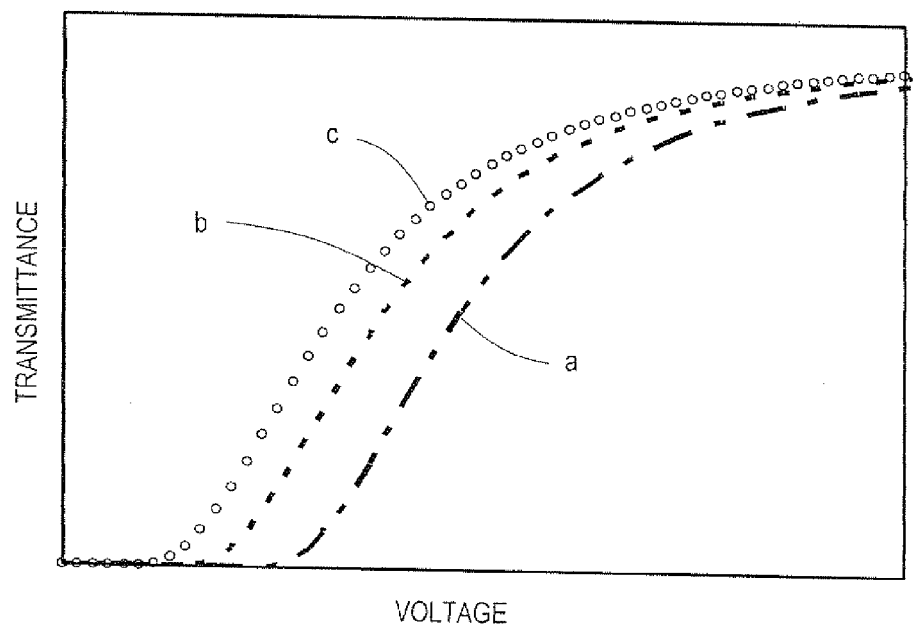
FIG. 11 A graph illustrating the VT characteristic of a pixel of the liquid crystal display device of embodiment 3.

FIG. 11 is a graph illustrating the VT characteristic in the first region 31' and the second region 32' when the display surface is viewed from a position in front of the display surface (in the polar angle 0° direction). In the graph, lines a and c represent the VT characteristics in the first region 31' and the second region 32', while line b represents the VT characteristic in the second region 32 of embodiment 1.

The pretilt angle in the first region 31' is equal to the pretilt angle in the first region 31 of embodiment 1, and therefore, these regions have equal VT characteristics. As seen from the VT characteristics represented by line c and line b, however, the transmittance in the second region 32' is higher than the transmittance in the second region 32 of embodiment 1. In embodiment 3, the pretilt angle is different between the first region 31' and the second region 32', so that the difference in brightness between these regions is larger than that of embodiment 1.

Figure 12:
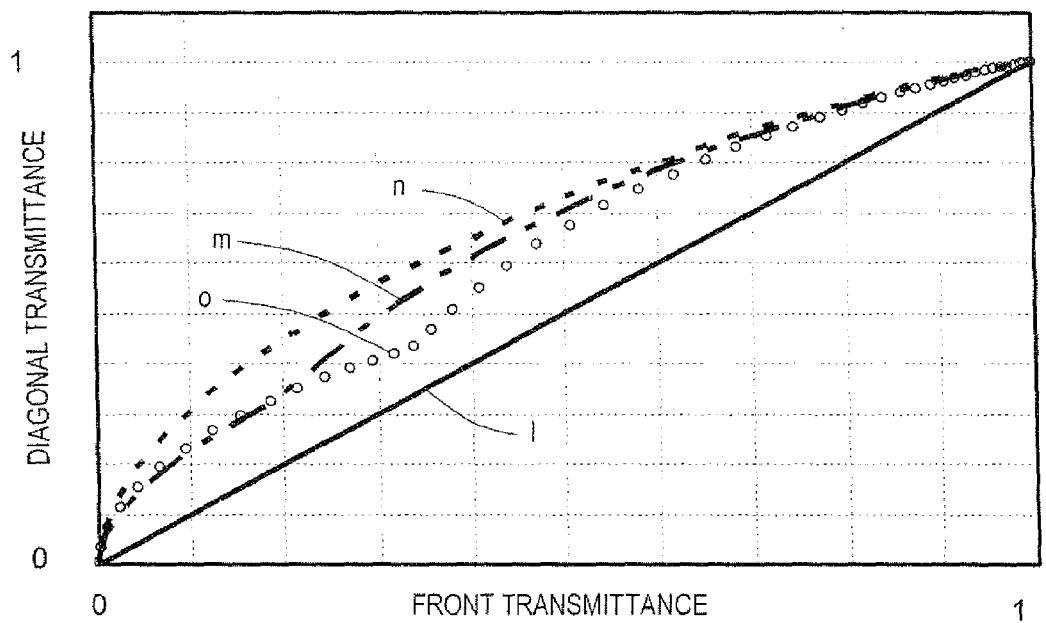
FIG. 12 A graph for illustrating the viewing angle characteristics of a pixel of the liquid crystal display device of embodiment 3.
Figure 13:
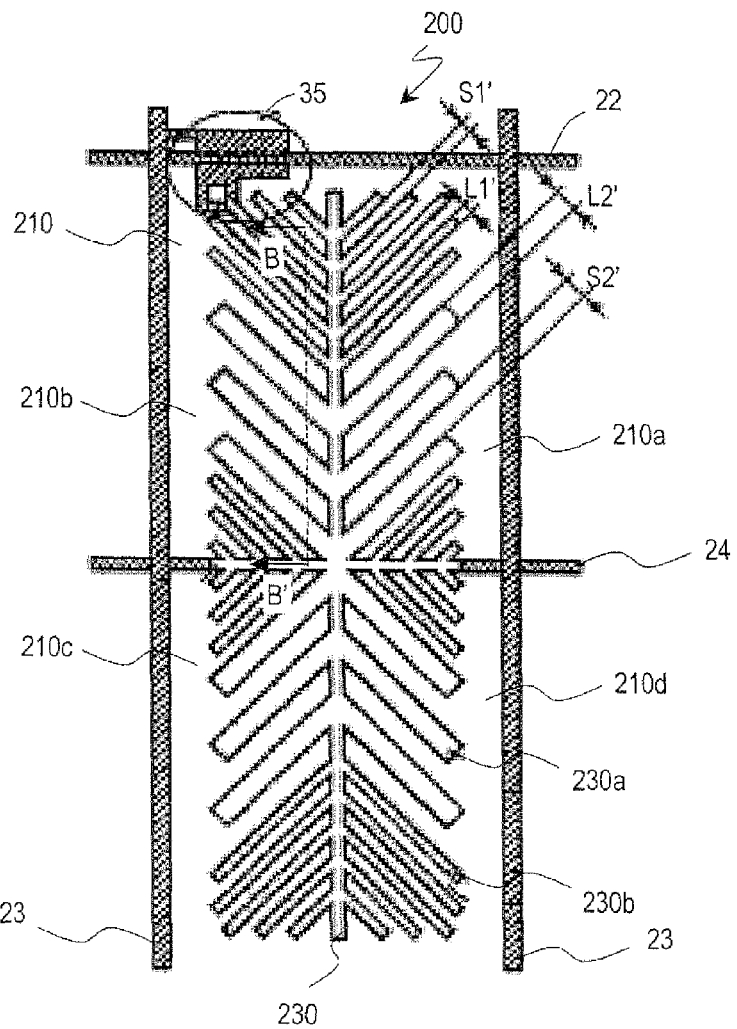
FIG. 13 A plan view schematically showing a structure of one pixel in a liquid crystal display device described in Patent Document 1.
Figure 14:
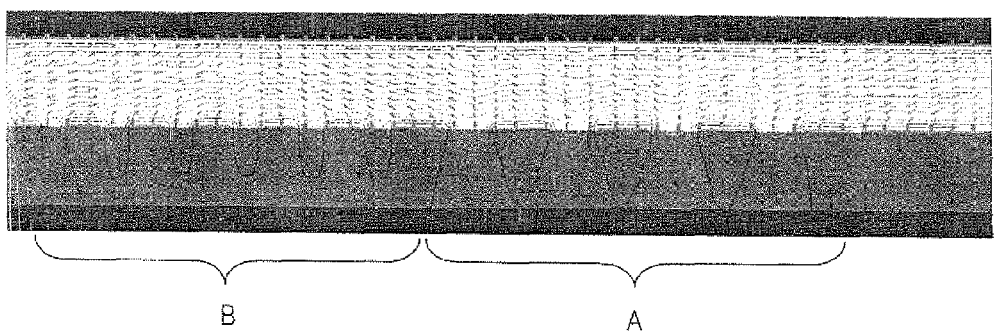
FIG. 14 A diagram showing the electric field distribution in a cross section of the pixel shown in FIG. 13 taken along line B-B'.

FIG. 12 is a graph for illustrating the viewing angle characteristics of the liquid crystal display device 102 of the present embodiment. In FIG. 12, line o represents the viewing angle characteristic of the pixel 10' of embodiment 3. Specifically, line o represents the average of the above-described viewing angle characteristics respectively obtained in the first region 31' and the second region 32'. Line m represents the viewing angle characteristic of the pixel 10 of embodiment 1, i.e., the viewing angle characteristic of a pixel which has the pixel electrode 30 but does not provide different pretilt angles. Line n represents the viewing angle characteristic obtained in any one of the first region 31' and the second region 32' (herein, the first region 31'). Note that line 1 in FIG. 12 is a reference line representing that the front transmittance and the diagonal transmittance are equal.

As seen from FIG. 12, by using the same pixel as that of embodiment 1 and providing a plurality of pretilt angles in the pixel, more excellent viewing angle characteristics can be obtained than a liquid crystal display device in which the pixel electrode has a single line width and a single slit width, and than the liquid crystal display device of embodiment 1 in which the pretilt angles in a pixel are all equal.

As described above, in embodiment 3, the pretilt angle is modified depending on the difference in line width or slit width of the pixel electrode 30. Therefore, display with higher brightness and more excellent viewing angle characteristics than embodiment 1 is possible. As seen from the comparison of embodiments 1 and 3, by modifying the pretilt angle depending on the difference in the line width or slit width of the pixel electrode 30, the viewing angle characteristics across the entire display surface can be improved, while the brightness can be adjusted within a wider range over the entire display surface.

INDUSTRIAL APPLICABILITY

The present invention is applicable to a liquid crystal display device which has a relatively small pixel pitch, such as a liquid crystal display device for a mobile phone, and the like.

The invention claimed is:
1. A vertical alignment type liquid crystal display device which has a plurality of pixels, comprising:
   a pair of polarizing plates which have transmission axes orthogonal to each other;
   a first electrode;
   a second electrode provided so as to oppose the first electrode; and
   a liquid crystal layer interposed between the first electrode and the second electrode,
   wherein each of the plurality of pixels includes a first region and a second region which are separated by a line parallel to or perpendicular to the directions of the transmission axes of the pair of polarizing plates,
   the first electrode includes, in each of the first region and the second region, a plurality of first branch portions extending in a first direction and a plurality of second branch portions extending in a second direction that is different from the first direction;
   each of the plurality of first branch portions in the first region has a first width, and
   each of the plurality of first branch portions in the second region has a second width that is different from the first width.
2. The liquid crystal display device of claim 1, wherein each of the plurality of second branch portions in the first region has the first width, and
   each of the plurality of second branch portions in the second region has the second width.
3. The liquid crystal display device of claim 1, wherein any adjacent two of the plurality of first branch portions in the first region are separated by a first space, and
   any adjacent two of the plurality of first branch portions in the second region are separated by a second space that is different from the first space.
4. The liquid crystal display device of claim 3, wherein any adjacent two of the plurality of second branch portions in the first region are separated by the first space, and
   any adjacent two of the plurality of second branch portions in the second region are separated by the second space.

5. The liquid crystal display device of claim 1, wherein the first region and the second region respectively correspond to one region and the other region of a pixel which are separated by a gate bus line or CS line.

6. The liquid crystal display device of claim 1, wherein the first region and the second region respectively correspond to one region and the other region of a pixel which are separated by a line parallel to a source bus line.

7. The liquid crystal display device of claim 1, wherein the first direction and the second direction are orthogonal to each other, and
directions of the transmission axes of the pair of polarizing plates and the first direction are different by 45°, 135°, 225°, or 315°.

8. The liquid crystal display device of claim 1, wherein when a voltage is applied across the liquid crystal layer, four liquid crystal domains among which an alignment direction of liquid crystal molecules is different are formed in each of the first region and the second region.

9. The liquid crystal display device of claim 1, wherein each of the plurality of pixels includes a third region separated from the first region or the second region by a line parallel to or perpendicular to the directions of the transmission axes, of the pair of polarizing plates,
the first electrode includes the plurality of first branch portions and the plurality of second branch portions in the third region, and
each of the plurality of first branch portions and the plurality of second branch portions in the third region has a third width that is different from the first width or the second width.

10. The liquid crystal display device of claim 1, wherein when a voltage is not applied across the liquid crystal layer, a tilt angle of liquid crystal molecules in the first region is different from a tilt angle of liquid crystal molecules in the second region.

11. A vertical alignment type liquid crystal display device which has a plurality of pixels, comprising:
a pair of polarizing plates which have transmission axes orthogonal to each other;
a first electrode;
a second electrode provided so as to oppose the first electrode; and
a liquid crystal layer interposed between the first electrode and the second electrode,
wherein each of the plurality of pixels includes a first region and a second region which are separated by a line parallel to or perpendicular to the directions of the transmission axes of the pair of polarizing plates,
the first electrode includes, in each of the first region and the second region, a plurality of first branch portions extending in a first direction and a plurality of second branch portions extending in a second direction that is different from the first direction;
any adjacent two of the plurality of first branch portions in the first region are separated by a first space, and
any adjacent two of the plurality of first branch portions in the second region are separated by a second space that is different from the first space.

12. The liquid crystal display device of claim 11, wherein any adjacent two of the plurality of second branch portions in the first region are separated by the first space, and
any adjacent two of the plurality of second branch portions in the second region are separated by the second space.

13. The liquid crystal display device of claim 11, wherein each of the plurality of pixels includes a third region separated from the first region or the second region by a line parallel to or perpendicular to the directions of the transmission axes of the pair of polarizing plates,
the first electrode includes the plurality of first branch portions and the plurality of second branch portions in the third region, and
any adjacent two of the plurality of first branch portions in the third region and any adjacent two of the plurality of second branch portions in the third region are separated by a third space that is different from the first space or the second space.

14. The liquid crystal display device of claim 11, wherein when a voltage is not applied across the liquid crystal layer, a tilt angle of liquid crystal molecules in the first region is different from a tilt angle of liquid crystal molecules in the second region.

15. A vertical alignment type liquid crystal display device which has a plurality of pixels, comprising:
a pair of polarizing plates which have transmission axes orthogonal to each other;
a first electrode;
a second electrode provided so as to oppose the first electrode; and
a liquid crystal layer interposed between the first electrode and the second electrode,
wherein each of the plurality of pixels includes a plurality of regions which are separated from each other by a line parallel to or perpendicular to the directions of the transmission axes of the pair of polarizing plates,
the first electrode includes, in each of the plurality of regions, a plurality of first branch portions extending in a first direction and a plurality of second branch portions extending in a second direction that is different from the first direction;
each of the plurality of first branch portions in one of the plurality of regions has a first width, and
each of the plurality of first branch portions in another one of the plurality of regions has a second width that is different from the first width.

16. The liquid crystal display device of claim 15, wherein each of the plurality of second branch portions in one of the plurality of regions has the first width, and
each of the plurality of second branch portions in the another one of the plurality of regions has the second width.

17. A vertical alignment type liquid crystal display device which has a plurality of pixels, comprising:
a pair of polarizing plates which have transmission axes orthogonal to each other;
a first electrode;
a second electrode provided so as to oppose the first electrode; and
a liquid crystal layer interposed between the first electrode and the second electrode,
wherein each of the plurality of pixels includes a plurality of regions which are separated from each other by a line parallel to or perpendicular to the directions of the transmission axes of the pair of polarizing plates, the first electrode includes, in each of the plurality of regions, a plurality of first branch portions extending in a first direction and a plurality of second branch portions extending in a second direction that is different from the first direction;

any adjacent two of the plurality of first branch portions in one of the plurality of regions are separated by a first space, and any adjacent two of the plurality of first branch portions in the another one of the plurality of regions are separated by a second space that is different from the first space.

18. The liquid crystal display device of claim 17, wherein any adjacent two of the plurality of second branch portions in one of the plurality of regions are separated by the first space, and any adjacent two of the plurality of second branch portions in the another one of the plurality of regions are separated by the second space.

* * * * *